United States Patent [19]
Best et al.

[11] Patent Number: 5,783,881
[45] Date of Patent: Jul. 21, 1998

[54] BRUSHLESS ELECTRIC MOTOR WITH HEAT SINK AND MOUNTING ARRANGEMENT THEREOF

[75] Inventors: Dieter Best, Ingelfingen; Bernhard Bamberger, Lauda-Unterbalbach; Helmut Lipp, Hohebach; Franz Jakob, Mulfingen-Zaisenhausen, all of Germany

[73] Assignee: emb Elektrobau Mulfingen GmbH & Co., Germany

[21] Appl. No.: 734,693

[22] Filed: Oct. 21, 1996

[30] Foreign Application Priority Data

Oct. 21, 1995 [DE] Germany ............... 29516656 U

[51] Int. Cl.$^6$ .................... H02K 11/00; H02K 11/04
[52] U.S. Cl. ............... 310/68 C; 310/68 R; 310/71; 310/64; 310/91; 318/254
[58] Field of Search ............ 310/68 C, 68 R, 310/71, 91, 64, 67 R; 318/138, 254; 361/386, 388, 389

[56] References Cited

U.S. PATENT DOCUMENTS

| | | | |
|---|---|---|---|
| 3,809,935 | 5/1974 | Kristen et al. | 310/68 |
| 4,079,278 | 3/1978 | Luneau | 310/154 |
| 4,631,433 | 12/1986 | Stokes | 310/89 |
| 4,668,898 | 5/1987 | Harms et al. | 318/254 |
| 4,840,222 | 6/1989 | Lakin et al. | 165/47 |
| 5,049,769 | 9/1991 | Reinhardt et al. | 310/64 |
| 5,430,931 | 7/1995 | Fisher et al. | 29/596 |
| 5,473,213 | 12/1995 | Kahle, Sr. | 310/270 |

FOREIGN PATENT DOCUMENTS

| | | |
|---|---|---|
| A-2153307 | 5/1973 | France. |
| A-3842588 | 6/1990 | Germany. |
| WO-A-9506971 | 3/1995 | WIPO. |

OTHER PUBLICATIONS

Motorola Technical Developments, vol. 9, Aug. 1989, "High Wattage Power Device Heat Sink and Retainer".

*Primary Examiner*—Steven L. Stephan
*Assistant Examiner*—Tran N. Nguyen
*Attorney, Agent, or Firm*—Jones & Askew

[57] ABSTRACT

A brushless dc external-rotor motor having a hollow cylindrical heat sink fastened to the peripheral border region of a printed circuit board. Power semiconductors are arranged on an inner cylinder wall of the heat sink in a heat conducting manner, and the cylinder wall forms part of the peripheral border of the stator flange in the motor. A connector fastens Hall generator(s) on the circuit board and provides the electrical connection with the circuit board. The connector can be soldered along with all other electronic components in a joint soldering process, wherein a subassembly of a preassembled circuit board and a heat sink fastened to its periphery and carrying the power semiconductors passes through a solder bath to solder all components in a single soldering process. It is subsequently necessary only to plug the Hall generator or generators onto the connector or connectors soldered onto the circuit board. The connector can include individual contact tubes, which are soldered in the circuit board and into which the connection pins of a respective Hall generator can be plugged.

8 Claims, 4 Drawing Sheets

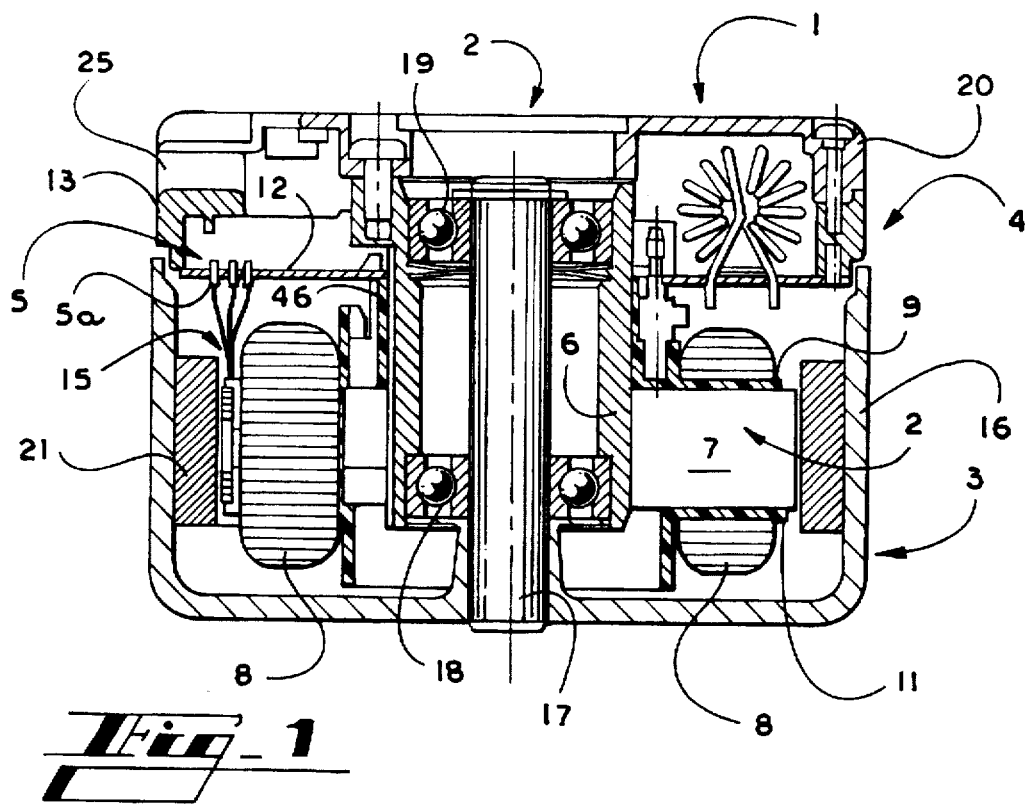
Fig_1
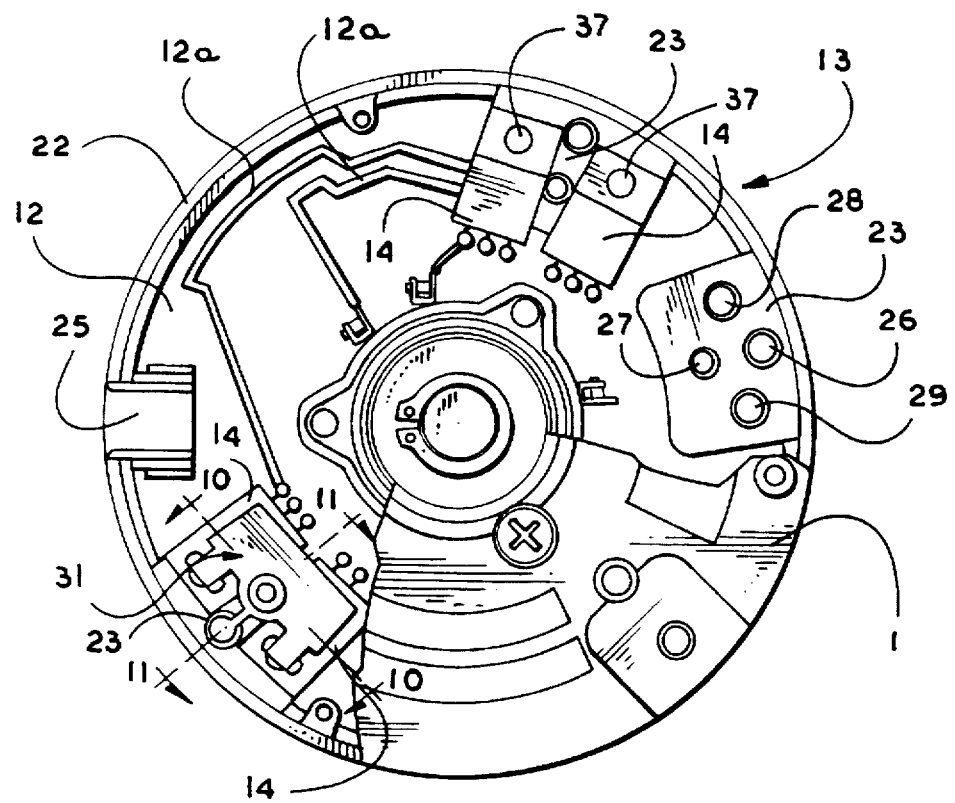
Fig_2

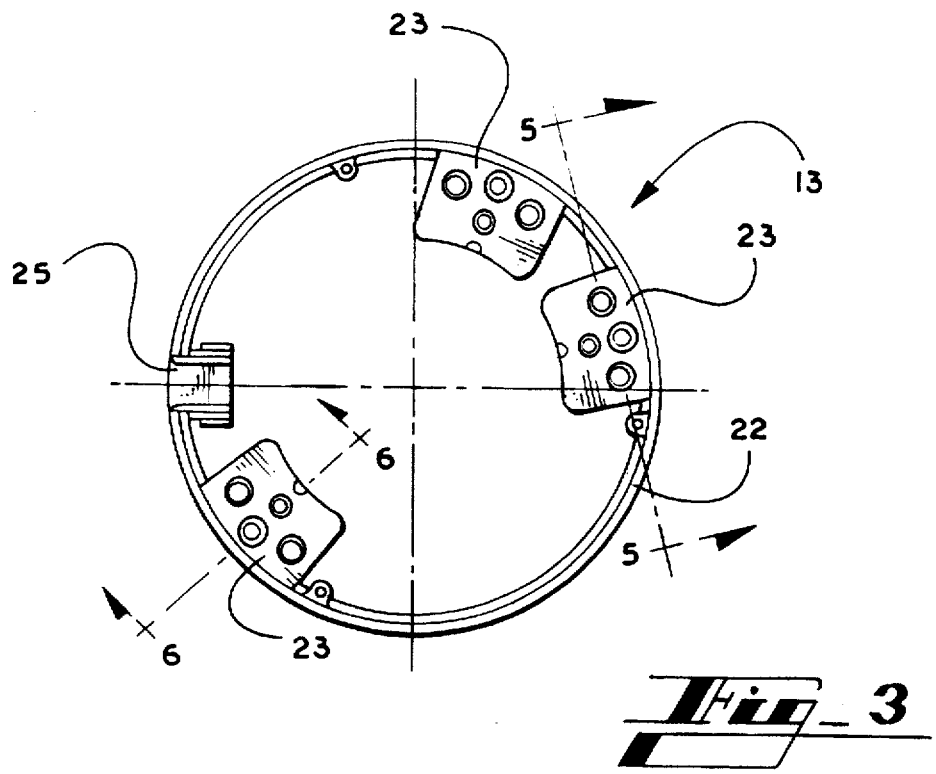
Fig_3
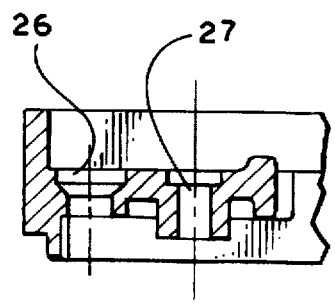
Fig_4
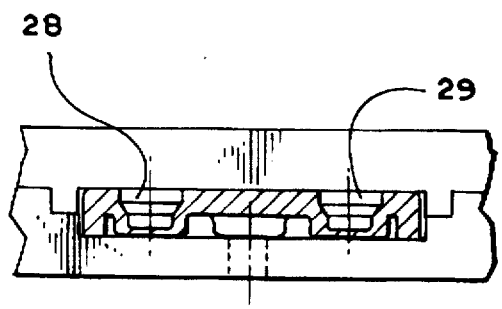
Fig_5

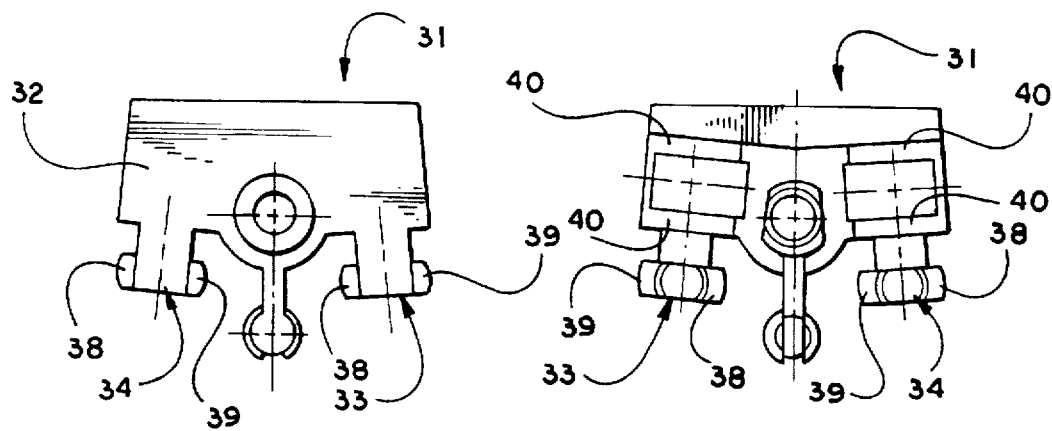
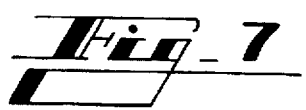
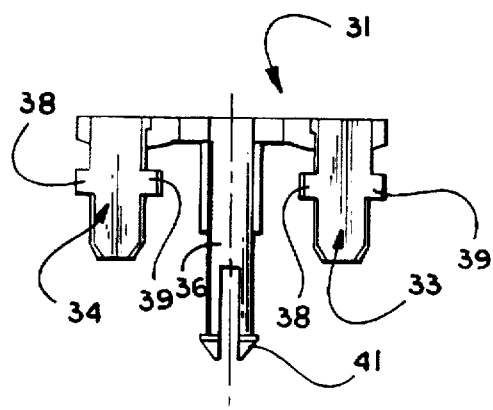
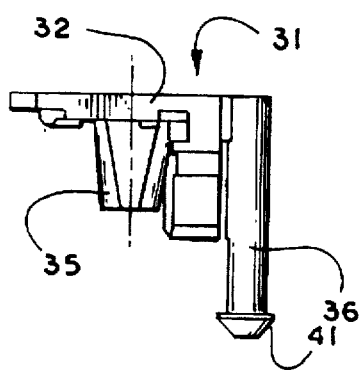
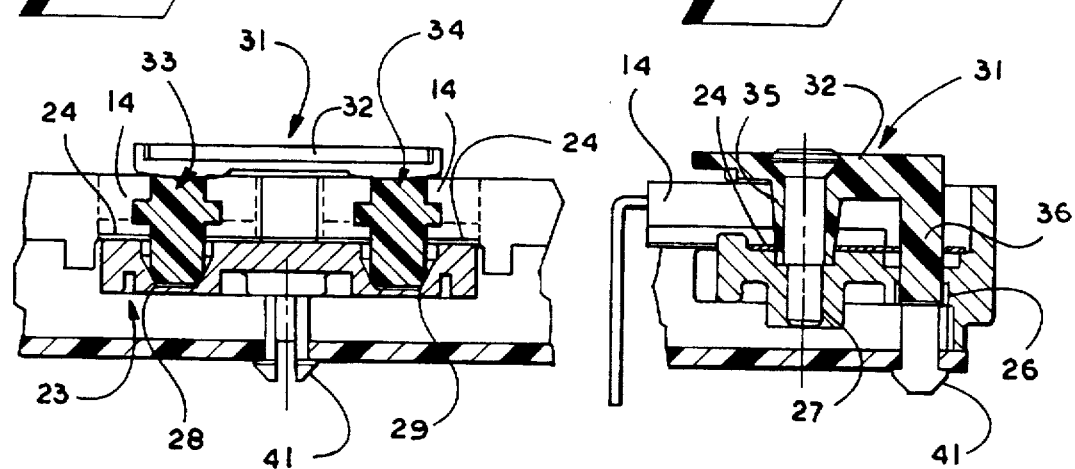

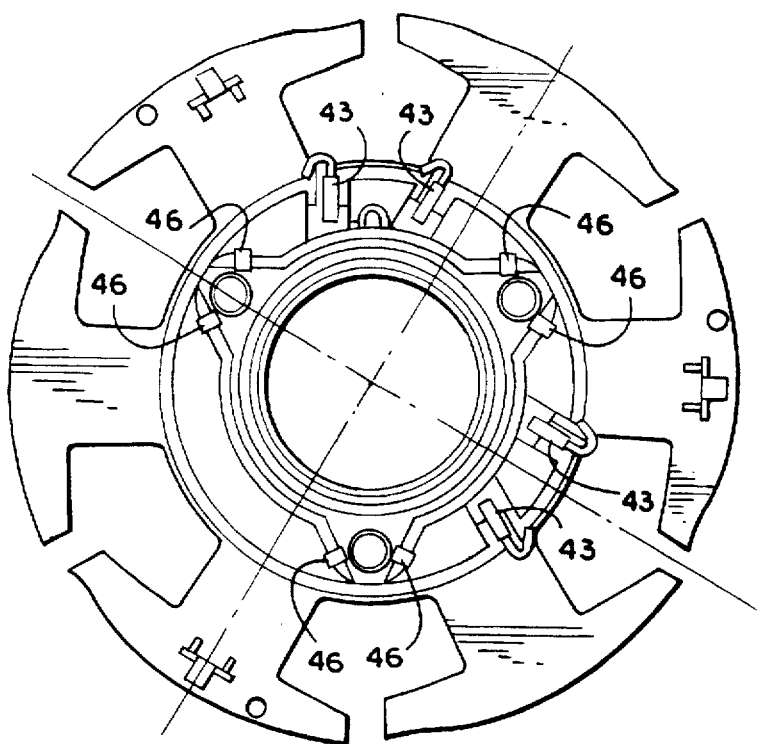
Fig_13
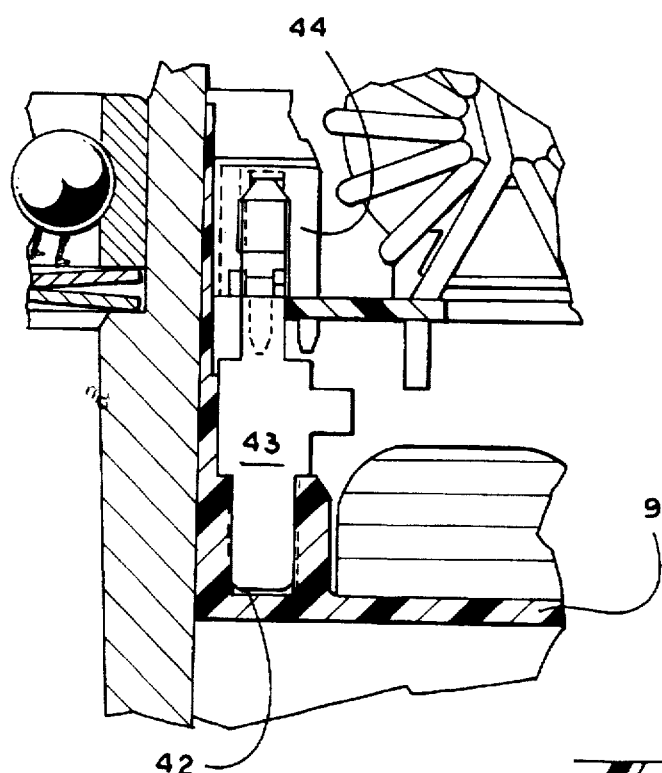
Fig_12

BRUSHLESS ELECTRIC MOTOR WITH HEAT SINK AND MOUNTING ARRANGEMENT THEREOF

The present invention pertains to a brushless electric motor, in particular, a dc external-rotor motor, composed of a stator with stator windings mounted on a stator flange, an external rotor which encloses the stator on its side facing away from the stator flange as well as an electronic circuit arrangement which controls the stator windings, having, on the flange side, a printed board which carries electronic components, arranged such that it faces the stator as well as power semiconductors, arranged to be spatially separate from the printed board and connected to the latter in an electrically conductive way.

For a brushless dc motor, a commutation is carried out of the stator currents per winding of power semiconductors, e.g., power transistors. This commutation process, i.e., the switching on and off of the winding current, is controlled by means of at least one Hall generator, which detects the respective angular position of the rotor. In particular with mid to high-capacity motors, heat caused by losses develops in the power semiconductors, such that the power semiconductors must be cooled in order to avoid their destruction with too great a development of heat.

A brushless dc external-rotor motor of the same generic class is known from DE 3,842,588 C2, which already meets many demands. This motor is composed, in essence, of a stator, a rotor in the form of an external rotor and a preassembled subassembly arranged between stator and rotor. This subassembly consists of, in essence, a printed board which carries the circuit arrangement for commutation of the stator windings, a disk-shaped heat sink and an annular carrier element which connects these two parts. In this connection, it has proven to be a disadvantage that several soldering processes are required in order to assemble the printed board. Since, for example, Hall generators must not be carried through a solder bath, their later assembly must be carried out by hand in a subsequent soldering process. For this, the soldering eyelets of the printed board must be covered, in the region of the Hall generator(s) to be mounted, before the first soldering process. However, a fabrication of this type, partially carried out by hand, is very time- and cost-intensive. In addition, it has proved to be a disadvantage that a preassembled subassembly is arranged, in essence, in the interior of the motor, with the subassembly being fastened over the disk-shaped heat sink on the inner side of the stator flange, such that only an indirect discharge of developing heat is possible by means of the heat sink and stator flange.

The underlying purpose of the present invention is to create a motor of the same generic class which, while having good cooling properties, guarantees a clearly simplified fabrication of the motor.

In accordance with the invention, this is achieved by means of the fact that a hollow cylindrical heat sink, on the inner cylinder wall of which power semiconductors are arranged in a heat conducting manner, is fastened to the peripheral border region of the printed board, and the cylinder wall, in a mounted state of the motor, forms an axially extending part of the peripheral border of the stator flange. In order to further simplify or automate the fabrication of a motor of this type, a connector is provided, in accordance with the invention, in order to fasten the Hall generator(s) on the printed board. This connector serves the electrical connection between Hall generator and printed board and can be soldered along with all other electronic components in a joint soldering process. It is consequently possible, in accordance with the invention, to preassemble a subassembly, composed of a preassembled printed board and a heat sink fastened to its periphery and carrying the power semiconductors, and to subsequently guide these completely through a solder bath. Thus, all components can be soldered in a single soldering process. It is subsequently necessary only to plug the Hall generator, or each Hall generator, onto the connector, or onto each connector which has been soldered. The connector can be composed of individual contact tubes, which are soldered in the printed board and into which the connection pins of a respective Hall generator can be plugged in an electrically conductive manner and fixed by this means.

Additional advantageous executions of the invention are contained in the following description of the figures. Shown are:

FIG. 1: an axial section of a motor in accordance with the invention;

FIG. 2: a view of the flange side of a motor in accordance with the invention, in arrow direction II of FIG. 1, with motor flange partially cut away;

FIG. 3: a plan view, from the direction of the flange side, of a heat sink in accordance with the invention;

FIG. 4: a section of the heat sink, along Line IV—IV in FIG. 3;

FIG. 5: a section of the heat sink, along Line V—V in FIG. 3;

FIGS. 6–9: a fastener in accordance with the invention, in order to fasten power semiconductors to the heat sink, in various views;

FIG. 10: a section along Line X—X in FIG. 2;

FIG. 11: a section along Line XI—XI in FIG. 2;

FIG. 12: an enlarged partial view of a region in accordance with FIG. 1;

FIG. 13: a top plan view of the stator-side insulating locking plate of the motor.

In the different figures, like parts and functionally corresponding parts are always provided with the same reference numbers.

FIG. 1 shows a brushless dc external-rotor motor in accordance with the invention, in an axial section. The motor is composed of, in essence, a stator flange (1), a stator (2) fastened to it, an external rotor (3) which encloses the stator (2) on its side facing away from the stator flange (1) as well as an electronics module (4) arranged between the stator flange (1) and the external rotor (3). The stator flange (1) is connected to the stator (2) by means of a bearing support tube (6). The stator (2) is composed, in a conventional way, in essence, of a stator core assembly (7) as well as different stator windings (8) which are insulated from the stator core assembly (7) by means of an insulating locking plate (9,11) on the stator side and on the rotor side respectively. For assembly, the stator core assembly (7), of the stator (2), is pushed onto the bearing support tube (6) and, preferably, pressed together with it. The bearing support tube (6), supporting the stator (2) is connected, on its side facing the stator flange (1), to the latter, preferably by means of being screwed down. An electronics module (4) is arranged between the stator (2) and the stator flange (1). The electronics module (4) is composed of, in essence, a printed board (12), on which is arranged an electronic circuit arrangement for commutation of the stator windings (8), as well as a hollow cylindrical heat sink (13), in particular, of an aluminum pressure diecasting, which serves for supporting cooling the power semiconductors (14). In accordance with the invention, a connector (5), for an electrical connection of a Hall generator (15) to the printed board (12), is arranged on the printed board (12). It is preferable for the connector (5) to be composed of individual (in particular, three) contact tubes (5a) which are soldered—jointly, along with other electronic components—to the printed board (12) or to printed conductors (12a). The Hall generator (18) possesses, conventionally, three connector pins which, in order to make an electric connection, are plugged into the contact tubes (see FIG. 1).

The external rotor (3) is composed, in a conventionally known way, of a bell-type rotor housing (16) which encloses the stator (2), and is supported over a rotor shaft (17) in ball bearings (18,19), which are pressed into the respective ends of the bearing support tube (6). A permanent magnet (21), which encloses the stator core assembly (7) in the direction of rotation, is arranged on the inner side of the rotor housing (16).

FIG. 2 represents a view of the external side of the stator flange, facing away from the stator (2), of a motor in accordance with the invention, with part of the stator flange (1) being cut away. In accordance with FIGS. 1 and 2, the heat sink (13) has, in essence, the same outer diameter as the stator flange (1) or rotor housing (16). The heat sink (13) is composed of a cylinder wall (22) as well as several holding elements (23) directed inward in a radial sense. This cylinder wall (22) forms, in accordance with the invention, part of a peripheral border (20) of the stator flange (1) extending in an axial direction, with the end of the cylinder wall (22) on the side facing the rotor housing (16) being connected, in particular being screwed down to the printed board (12) and the opposite end being screwed down to the stator flange (1). In addition, it is preferable for the cylinder wall (22) of the heat sink (13) to feature a cut-out (25) for the supply of motor connecting leads. The holding elements (23) serve for a nonpositive and/or positive holding of the power semiconductors (14) and are connected in a thermally conductive and electrically insulated way to the holding elements (23) of the heat sink (13). In order to guarantee a connection between the power semiconductors (14) and the holding elements (23) which on one hand is heat-conducting and on the other hand is electrically insulating, a heat transfer film (24) is arranged in each case between these two parts (14,23) (see FIGS. 10,11). In the embodiment represented, the holding elements (23) are preferably in the form of brackets, with each holding element (23) being formed in such a way that two power semiconductors (14) can be fastened per holding element (23). In the embodiment represented, it is preferable for each holding element (23) to feature two through-holes (26,27), as well as two blind holes (28,29). The through-holes (26,27) and the blind holes (28,29) serve, in particular, in the fastening of the power semiconductors (14). For this, the power semiconductors (14) are put on the holding elements (23) and fastened to the holding elements (23) with the aid of specially shaped fasteners (31). FIG. 2 represents a heat sink in accordance with the invention, having three holding elements (23), with one holding element (23) being represented neither with power semiconductors (14) nor a fastener (31), one holding element (23) being represented with power semiconductors (14) but without the fastener (31) and one holding element (23) being represented with mounted semiconductors (14) and fastener (31).

One possible embodiment of such a fastener (31) is represented in FIGS. 6–9. A fastener (31), fabricated in particular of a thermoplastic, is composed in essence of a cover plate (32) which is arranged, when viewed in the mounted state of the fastener (31), parallel to the bracket-type holding element (23), positioning arms (33,34) which extend in the direction of the holding element (23), a mounting peg (35) which likewise extends in the direction of the holding element (23) and a locking peg (36) which again extends in the direction of the holding element (23), through the through-hole (26), in order to hold the printed board (12).

In order to fasten one or two power semiconductors (14) to a holding element (23), the power semiconductors (14) are put side by side on the holding element (23) when viewed in the direction of the periphery, and held on the holding element (23) positively or nonpositively with the aid of the fastener (31). For this, the two positioning arms (33,34) of the fastener (31) reach through fastening holes (37) of the power semiconductors (14) and the ends of the positioning arms facing away from the cover plate (32) engage with the blind holes (28,29) of the holding element (23) (FIG. 10). In this connection, it is preferable for the positioning arms (33,34) to feature lateral projections (38, 39) which press the mounted power semiconductors (14) against the supporting surface of the holding element (23). At the same time, in a mounted position, the mounting peg (35), on one hand, engages with the region of the through-hole (27) of the holding element (23), while the locking peg (36) is guided through the through-hole (26) of the holding element (23) (FIG. 11).

In this connection, the through-hole (27) is preferably in the form of a stepped bore hole, such that the mounting peg (35), in a mounted state, is supported against the step of the through-hole (27), guaranteeing a precisely defined clearance between the cover plate (32) of the fastener (31) and the supporting surface of the holding element (23). The aforementioned engagement of the mounting peg (35) in the stepped bore hole (27) guarantees that in the stepped region, sufficient leakage current clearances are met between the lower metallic power semiconductor part and the supporting surface of the holding element (23).

In addition, the surfaces of the cover plates (32) of the fasteners (31), which face the power semiconductors (14), feature pressure surfaces (40) which extend in the direction of the power semiconductors (14). When the fasteners (31) are mounted, the pressure surfaces (40) cause additional pressure on the power semiconductors (14), guaranteeing a good heat-conducting connection between the power semiconductors (14) and the holding elements (23) of the heat sink (13).

The side of the through-hole (26) which faces the power semiconductor (14) is preferably enlarged or countersunk, such that it forms a guide for a snap-in catch (41) arranged on the locking peg (36). The end of the locking peg (36) which features the snap-in catch (41) is preferably slotted so that the snap-in catch (41) can be expanded elastically. In a mounted state of the power semiconductors (14), the locking peg (36) of the fastener (31) extends through the through-hole (26) of the holding element (23) and, with the snap-in catch (41), grips behind an opening located at the outer border of the printed board (12) (FIGS. 10,11), guaranteeing a fastening of the printed board (12) to the heat sink (13). A screw connection of the two parts (12,13) is provided in addition, or alternatively to this snap-in connection between the heat sink (13) and printed board (12). For this, the end of the border region of the printed board (12) which faces the rotor housing (16), is screwed down to the cylinder wall (22) of the heat sink (13) (FIG. 1).

FIG. 4 represents the holding element (23) of the heat sink (13) in a radial section. Shown here are the two through-holes (26,27) of the holding element (23), arranged in succession radially. The through-hole (27) serves, in addition to accommodating the mounting peg (35) in its first part of the stepped bore hole, in order to fasten the fastener (31) by means of an additional screw or the like. For this, the through-hole (27) can be provided with a screw thread in the region of the narrower part of the stepped bore hole. On the other hand, it is possible to execute the through-hole (27) without a screw thread and to adapt its diameter to a thread-cutting screw.

FIG. 12 further shows an enlarged partial view of a cutout in accordance with FIG. 1. Represented here is a part of the stator-side insulating locking plate (9), which features several open receivers (42) on the side of the stator and distributed about its periphery. The receivers (42) serve for the fastening of connection pins (43) which, on one hand serve to connect wire ends of the stator windings (8) and, on the other hand, serve for a connection, in particular, a pluggable electric connection, of the stator windings (8) to the printed board (12). For this, the end of each connection pin (43) which faces away from the insulating locking plate (9) engages, though openings in the printed board (12), with plug-in contacts (44) arranged in the latter. For an additional holding of the printed board (12) or of the electronic module (4), the stator-side insulating locking plate (9) features lock-in arms (46) distributed about its periphery and extending in the direction of the printed board (12) and through the same.

FIG. 13 shows a view of the stator-side insulating locking plate (9) with connection pins (43) held in the receiver openings (42). Further, lock-in arms (46) distributed about the periphery, preferably in a uniform distribution, can be recognized in plan view.

The invention, rather than being limited to the embodiments represented and described, also includes all embodiments which act equally in the sense of the invention.

We claim:

1. A brushless electric motor comprising:
   a stator (2) with stator windings (8) mounted on a stator flange (1);
   an external rotor (3) which encloses the stator (2) on a side facing away from the stator flange (1);
   an electronic circuit arrangement disposed between the stator and the stator flange and having, on a flange side, a printed board (12) mounted to face the stator (2) and carrying electronic components including power semiconductors (14) arranged to be spatially separate from the printed board (12) and connected to the printed board in an electrically conductive way;
   a hollow cylindrical heat sink (13) fastened to a peripheral border region of the printed board (12) and having an inner cylinder wall (22) for receiving the power semiconductors (14) in a heat conducting manner, so that the cylinder wall (22), in a mounted state of the motor, forms part of a peripheral border (20) of the stator flange (1), extending in an axial direction; and
   the inner cylinder wall (22) of the heat sink (13) having several holding elements (23) directed radially inwardly, the holding elements (23) being in the form of brackets.

2. A brushless electric motor comprising:
   a stator (2) with stator windings (8) mounted on a stator flange (1);
   an external rotor (3) which encloses the stator (2) on a side facing away from the stator flange (1);
   an electronic circuit arrangement disposed between the stator and the stator flange and having, on a flange side, a printed board (12) mounted to face the stator (2) and carrying electronic components including power semiconductors (14) arranged to be spatially separate from the printed board (12) and connected to the printed board in an electrically conductive way;
   a hollow cylindrical heat sink (13) fastened to a peripheral border region of the printed board (12) and having an inner cylinder wall (22) for receiving the power semiconductors (14) in a heat conducting manner, so that the cylinder wall (22), in a mounted state of the motor, forms part of a peripheral border (20) of the stator flange (1), extending in an axial direction;
   the inner cylinder wall (22) of the heat sink (13) having several holding elements (23) directed radially inwardly; and
   the holding elements (23) being operative to fasten two power semiconductors (14) per holding element (23).

3. A brushless electric motor comprising:
   a stator (2) with stator windings (8) mounted on a stator flange (1);
   an external rotor (3) which encloses the stator (2) on a side facing away from the stator flange (1); an electronic circuit arrangement disposed between the stator and the stator flange and having, on a flange side, a printed board (12) mounted to face the stator (2) and carrying electronic components including power semiconductors (14) arranged to be spatially separate from the printed board (12) and connected to the printed board in an electrically conductive way;
   a hollow cylindrical heat sink (13) fastened to a peripheral border region of the printed board (12) and having an inner cylinder wall (22) for receiving the power semiconductors (14) in a heat conducting manner, so that the cylinder wall (22), in a mounted state of the motor, forms part of a peripheral border (20) of the stator flange (1), extending in an axial direction;
   the inner cylinder wall (22) of the heat sink (13) having several holding elements (23) directed radially inwardly;
   the power semiconductors (14) being fastened to the holding elements (23), by means of either positive or nonpositive fasteners (31); and
   the fasteners (31) including a cover plate (32) arranged parallel to a supporting surface of the holding elements (23), and positioning arms (33,34) extending from the cover plate (32) in the direction of the holding element (23) and a sleeve-like mounting peg (35).

4. The brushless electric motor of claim 3, characterized in that the fasteners (31) are screwed down to the holding elements (23) while encasing the power semiconductors (14).

5. The brushless electric motor of claim 3, characterized in that the positioning arms (33,34) of the fasteners (31) feature lateral projections (38,39) facing outward in a radial sense, which press the mounted power semiconductors (14) against the supporting surface of the holding element (23).

6. A brushless electric motor comprising:
   a stator (2) with stator windings (8) mounted on a stator flange (1);
   an external rotor (3) which encloses the stator (2) on a side facing away from the stator flange (1);
   an electronic circuit arrangement disposed between the stator and the stator flange and having, on a flange side, a printed board (12) mounted to face the stator (2) and carrying electronic components including power semiconductors (14) arranged to be spatially separate from the printed board (12) and connected to the printed board in an electrically conductive way;

a hollow cylindrical heat sink (13) fastened to a peripheral border region of the printed board (12) and having an inner cylinder wall (22) for receiving the power semiconductors (14) in a heat conducting manner, so that the cylinder wall (22), in a mounted state of the motor, forms part of a peripheral border (20) of the stator flange (1), extending in an axial direction;

the inner cylinder wall (22) of the heat sink (13) having several holding elements (23) directed radially inwardly;

the power semiconductors (14) being fastened to the holding elements (23), by means of either positive or nonpositive fasteners (31); and the fasteners (31) including at least one locking peg (36) operative for a nonpositive or positive fastening of the printed board (12) to the heat sink (13).

7. A brushless electric motor comprising:

a stator (2) with stator windings (8) mounted on a stator flange (1);

an external rotor (3) which encloses the stator (2) on a side facing away from the stator flange (1);

an electronic circuit arrangement disposed between the stator and the stator flange and having, on a flange side, a printed board (12) mounted to face the stator (2) and carrying electronic components including power semiconductors (14) arranged to be spatially separate from the printed board (12) and connected to the printed board in an electrically conductive way;

a hollow cylindrical heat sink (13) fastened to a peripheral border region of the printed board (12) and having an inner cylinder wall (22) for receiving the power semiconductors (14) in a heat conducting manner, so that the cylinder wall (22), in a mounted state of the motor, forms part of a peripheral border (20) of the stator flange (1), extending in an axial direction; and the stator (2) including two insulating locking plates (9,11) on the stator-flange side and on the rotor side, respectively, of the stator, with the insulating locking plate (9) on the side of the stator having several open receivers (42) on the side of the stator flange in order to fasten connection pins (43);

connection pins (43) fastened at one end in the receivers in the insulating locking plate (9) and having another end in the form of a tab-like plug which, through holes in the printed board (12), engages with plug-in contacts (44) arranged on the printed board; and each connection pin (43) includes an extension for the connection of the wire ends of the stator windings.

8. A brushless electric motor comprising:

a stator (2) with stator windings (8) mounted on a stator flange (1);

an external rotor (3) which encloses the stator (2) on a side facing away from the stator flange (1);

an electronic circuit arrangement disposed between the stator and the stator flange and having, on a flange side, a printed board (12) mounted to face the stator (2) and carrying electronic components including power semiconductors (14) arranged to be spatially separate from the printed board (12) and connected to the printed board in an electrically conductive way;

a hollow cylindrical heat sink (13) fastened to a peripheral border region of the printed board (12) and having an inner cylinder wall (22) for receiving the power semiconductors (14) in a heat conducting manner, so that the cylinder wall (22), in a mounted state of the motor, forms part of a peripheral border (20) of the stator flange (1), extending in an axial direction;

the stator (2) including two insulating locking plates (9,11) on the stator-flange side and on rotor side, respectively, of the stator, with the insulating locking plate (9) on the side of the stator including several open receivers (42) on the side of the stator flange in order to fasten connection pins (43); and the stator-side insulating locking plate (9) including several lock-in arms (46) arranged distributed about the periphery of the stator-side locking plate and extending in an axial sense in the direction of the stator flange (1) to engage with openings in the printed boards (12) and positively or nonpositively fix the printed boards.

* * * * *

UNITED STATES PATENT AND TRADEMARK OFFICE
CERTIFICATE OF CORRECTION

PATENT NO. : 5,783,881

DATED : July 21, 1998

INVENTOR(S) : Dieter Best, et al.

It is certified that error appears in the above-identified patent and that said Letters Patent is hereby corrected as shown below:

On the title page of the patent, at INID Code 73, the name of the Assignee should read --ebm Elektrobau Mulfingen GmbH & Co.-- instead of "emb...".

Signed and Sealed this

Twenty-seventh Day of July, 1999

Attest:

Q. TODD DICKINSON

*Attesting Officer*       *Acting Commissioner of Patents and Trademarks*